(12) United States Patent
Seo et al.

(10) Patent No.: US 9,389,027 B2
(45) Date of Patent: Jul. 12, 2016

(54) PLATE-TYPE HEAT EXCHANGER REACTOR AND METHOD FOR PRODUCING THE SAME

(71) Applicant: Korea Institute of Energy Research, Daejeon (KR)

(72) Inventors: Dong Joo Seo, Daejeon (KR); Wang Lai Yoon, Daejeon (KR); Un-Ho Jung, Daejeon (KR); Kee Young Koo, Daejeon (KR); Sang-Ho Park, Daejeon (KR); Young Jae Hwang, Daejeon (KR); Woohyun Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 128 days.

(21) Appl. No.: 14/314,079

(22) Filed: Jun. 25, 2014

(65) Prior Publication Data

US 2015/0159962 A1    Jun. 11, 2015

(30) Foreign Application Priority Data

Dec. 11, 2013    (KR) .................. 10-2013-0153583

(51) Int. Cl.
*F28F 9/00*    (2006.01)
*F28F 3/02*    (2006.01)
(Continued)

(52) U.S. Cl.
CPC ............. *F28F 3/025* (2013.01); *B01J 19/0093* (2013.01); *B01J 19/249* (2013.01); *B23K 26/24* (2013.01);
(Continued)

(58) Field of Classification Search
CPC ....... F28F 3/025; F28F 9/0075; B01J 19/249; B01J 19/0093; B01J 2219/2453; B01J 2219/00822; B01J 2219/2496; B01J 2219/2459; B01J 2219/2497; B01J 2219/2479; B01J 2219/00786; B01J 2219/0087; B01J 2219/2495; B01J 2219/00085; B01J 2219/2458; B01J 2219/00835; B01J 2219/00806; B01J 2219/2498; F28D 9/00; F28D 9/0062; F28D 9/0006; F28D 9/0025; F28D 2021/0022; B23K 26/32; B23K 26/24; B23K 2203/50; B23K 2201/14
See application file for complete search history.

(56) References Cited

U.S. PATENT DOCUMENTS 8,047,272 B2 *    11/2011    Whittenberger ....... B21D 53/02
165/133
2005/0161206 A1 *    7/2005    Ambros .............. F02B 29/0462
165/173

(Continued)

FOREIGN PATENT DOCUMENTS

JP    2001-183078        7/2001
JP    2001-183078 A      7/2001

(Continued)

OTHER PUBLICATIONS

Office Action issue on Feb. 13, 2015 against the corresponding Korean Patent Application No. 10-2013-0153583 without an English translation.

*Primary Examiner* — David Bryant
*Assistant Examiner* — Jun Yoo
(74) *Attorney, Agent, or Firm* — Hammer & Associates, P.C.

(57) ABSTRACT

The present invention relates to a plate-type heat exchange reactor and a method of manufacturing thereof, and there is provided a method of manufacturing a plate-type heat exchange reactor and a plate-type heat exchange reactor manufactured in the manufacturing method, the method including the steps of preparing side surface plates respectively provided with a plurality of slits formed in parallel along a longitudinal direction; arranging two side surface plates in a vertical direction to face each other with a space therebetween; forming a plurality of fluid passage channels by inserting a plurality of fluid passage partition walls into the slits provided on the two side surface plates in parallel in a horizontal direction; and bonding the side surface plates and the fluid passage partition walls.

7 Claims, 7 Drawing Sheets

(51) Int. Cl.
  *B23K 26/24*   (2014.01)
  *B23K 26/32*   (2014.01)
  *F28F 9/007*   (2006.01)
  *F28D 9/00*    (2006.01)
  *B01J 19/00*   (2006.01)
  *B01J 19/24*   (2006.01)
  *F28D 21/00*   (2006.01)

(52) U.S. Cl.
  CPC . *B23K 26/32* (2013.01); *F28D 9/00* (2013.01); *F28F 9/0075* (2013.01); *B01J 2219/00786* (2013.01); *B01J 2219/00806* (2013.01); *B01J 2219/00822* (2013.01); *B01J 2219/00835* (2013.01); *B01J 2219/00873* (2013.01); *B01J 2219/2453* (2013.01); *B01J 2219/2459* (2013.01); *B01J 2219/2479* (2013.01); *B01J 2219/2485* (2013.01); *B01J 2219/2496* (2013.01); *B01J 2219/2497* (2013.01); *B01J 2219/2498* (2013.01); *B23K 2201/14* (2013.01); *B23K 2203/50* (2015.10); *F28D 2021/0022* (2013.01)

(56) References Cited

U.S. PATENT DOCUMENTS

2007/0261837 A1    11/2007  Valensa et al.
2013/0192803 A1*    8/2013  Garret .................. F28D 7/1684
                                                    165/151

FOREIGN PATENT DOCUMENTS

JP         4324924        9/2009
KR    2010-0083549 A      7/2010

* cited by examiner

PLATE-TYPE HEAT EXCHANGER REACTOR AND METHOD FOR PRODUCING THE SAME

CROSS-REFERENCE TO RELATED APPLICATION

This application claims priority to and the benefit of Korean Patent Application No. 10-2013-0153583, filed Dec. 11, 2013, the disclosure of which is incorporated herein by reference in its entirety.

BACKGROUND OF THE INVENTION

1. Field of the Invention

The present invention relates to a plate-type heat exchange reactor and a method of manufacturing thereof, and particularly, to an apparatus integrating a heat exchanger and a reactor and a method of manufacturing thereof, in which heat exchange functions for removing and supplying heat of reaction generated as a reaction is progressed are performed in the same apparatus.

2. Background of the Related Art

In configuring a plate-type heat exchanger, a conventional method arranges two side bars on both side surfaces of a partitioning plate forming channels, places a heat exchange fin designed to fit to the height of the side bars between the partitioning plates, and welds the side bars and the partitioning plates. In such a method, the height of the side bars should be larger than a predetermined height so as to easily weld the side bars and the partitioning plates, and a lower limit of the height of the heat exchange fin is restricted accordingly.

In order to configure a plate-type heat exchange reactor, it is general that two types of fluid passage channels are provided so as not to mix two types of fluids with each other and a reactor is configured by alternately stacking the fluid passage channels on one another. At this point, a fluid passage in which a reaction is progressed is referred to as a reaction fluid passage, and a fluid passage through which a fluid flows to exchange heat without progressing a reaction is referred to as a heat exchange fluid passage. Generally, a catalyst is installed in the reaction fluid passage to accelerate the reaction. A method of supporting the catalyst on the surface of a heat exchange plate structure is frequently used.

SUMMARY OF THE INVENTION

Therefore, the present invention has been made in view of the above problems, and it is an object of the present invention to provide a plate-type heat exchange reactor and a method of manufacturing thereof, which is easy to manufacture and may save parts and unit price.

Another object of the present invention is to provide a plate-type heat exchange reactor and a method of manufacturing thereof, which can provide required mechanical strength.

Another object of the present invention is to provide a plate-type heat exchange reactor and a method of manufacturing thereof, which can easily insert and remove a heat exchange fin structure and suppress thermal deformation of the heat exchange fin structure.

In order to accomplished the above objects, the present invention provides a method of manufacturing a plate-type heat exchange reactor, the method including the steps of: preparing side surface plates respectively provided with a plurality of slits formed in parallel along a longitudinal direction; arranging two side surface plates in a vertical direction to face each other with a space therebetween; forming a plurality of fluid passage channels by inserting a plurality of fluid passage partition walls into the slits provided on the two side surface plates in parallel in a horizontal direction; and bonding the side surface plates and the fluid passage partition walls.

The manufacturing method of the present invention may additionally include the step of bonding a top surface plate and a bottom surface plate on a top and a bottom of an assembly of the side surface plates and the fluid passage partition walls.

In the present invention, the top surface plate and the bottom surface plate may have a width corresponding to a space of arranging the two side surface plates and have extended portions protruded in a horizontal direction beyond the space of arranging the two side surface plates at both end portions of the top surface plate and the bottom surface plate.

In the present invention, the slits may be formed on the side surface plates excluding both end portions of the side surface plates.

The manufacturing method of the present invention may additionally include the step of cutting, after bonding the top surface plate and the bottom surface plate, the both end portions of the two side surface plates where the slits are not formed.

The manufacturing method of the present invention may additionally include the step of bonding a front surface plate and a rear surface plate onto a front side and a rear side of the assembly, respectively after the cutting step.

In the present invention, the front surface plate and the rear surface plate may respectively have a plurality of branch units corresponding to the fluid passage partition walls or the fluid passage channels and an extended portion combined with one ends of the extended portions of the top surface plate and the bottom surface plate.

The manufacturing method of the present invention may additionally include the step of bonding connection members to the front surface plate and the rear surface plate respectively after the step of bonding the front surface plate and the rear surface plate.

In the present invention, the connection member may have a shape of a hexahedron corresponding to the height and arranging space of the two side surface plates and having open front and rear sides.

The manufacturing method of the present invention may additionally include the step of bonding, after the step of bonding the connection members, connection plates combined with different ends of the extended portions of the top surface plate and the bottom surface plate so as to face with the extended portions of the front surface plate and the rear surface plate.

In the present invention, the slits may be formed on the side surface plates excluding 5 to 10 mm from both ends of the side surface plates in the longitudinal direction.

In the present invention, a thickness of the side surface plates may be 1 to 3 mm.

In the present invention, the fluid passage partition walls may have a length and thickness corresponding to the slits.

In the present invention, a thickness of the fluid passage partition walls may be 0.1 to 0.5 mm.

In the present invention, more fluid passage channels than the number of slits by one may be formed by the fluid passage partition walls.

The manufacturing method of the present invention may additionally include the step of inserting an insert for supporting the space between the fluid passage channels in each fluid passage channels before the step of bonding the side surface plates and the fluid passage partition walls.

In the present invention, the insert may be a heat exchange fin structure or a metal plate having projections and depressions.

In the present invention, a length of the top surface plate and the bottom surface plate excluding the extended portions at both ends may be shorter than a length of the slits by 5 to 10 mm.

In the present invention, the bonding may be performed by laser welding.

The manufacturing method of the present invention may additionally include the step of inserting the heat exchange fin structure into the fluid passage channels.

In the present invention, the heat exchange fin structure may have a shape repetitively connecting mountains and valleys.

In the present invention, a heat exchange fin structure for heat exchange may be inserted in some of the fluid passage channels, and a heat exchange fin structure for reaction may be inserted in the other fluid passage channels.

In the present invention, the heat exchange fin structure for heat exchange may be inserted when the side surface plates and the fluid passage partition walls are assembled, and the heat exchange fin structure for reaction may be inserted after final assembly of the reactor is completed.

In the present invention, a catalyst may be coated or supported on the heat exchange fin structure for reaction.

A method of manufacturing a plate-type heat exchange reactor according to a preferred embodiment of the present invention may include the steps of: preparing side surface plates respectively provided with a plurality of slits formed in parallel along a longitudinal direction, excluding at both end portions; arranging two side surface plates in a vertical direction to face each other with a space therebetween; forming a plurality of fluid passage channels by inserting a plurality of fluid passage partition walls into the slits provided on the two side surface plates in parallel in a horizontal direction; bonding the side surface plates and the fluid passage partition walls; bonding a top surface plate and a bottom surface plate respectively having a width corresponding to the space of arranging the two side surface plates and having extended portions protruded in a horizontal direction beyond the space of arranging the two side surface plates at both end portions of the top surface plate and the bottom surface plate on a top and a bottom of an assembly of the side surface plates and the fluid passage partition walls; cutting the both end portions of the two side surface plates where the slits are not formed; bonding a front surface plate and a rear surface plate respectively having a plurality of branch units corresponding to the fluid passage partition walls or the fluid passage channels and an extended portion combined with one ends of the extended portions of the top surface plate and the bottom surface plate onto a front side and a rear side of the assembly, respectively; bonding connection members having a shape of a hexahedron corresponding to the height and arranging space of the two side surface plates and having open front and rear sides to the front surface plate and the rear surface plate, respectively; and bonding connection plates combined with different ends of the extended portions of the top surface plate and the bottom surface plate so as to face with the extended portions of the front surface plate and the rear surface plate. New slits may be formed by cutting, for example wire cutting portions between the slits positioned at the side of fluid passages corresponding to heat exchange fluid passages of which both ends are blocked by the branch units, and the new slits may be used as inlet and outlet fluid passages.

In addition, the present invention provides a plate-type heat exchange reactor including: two side surface plates respectively provided with a plurality of slits formed in parallel along a longitudinal direction and arranged in the vertical direction to face each other with a space therebetween; and a plurality of fluid passage partition walls respectively inserted in the slits of the two side surface plates in parallel in a horizontal direction to form a plurality of fluid passage channels.

In addition, a plate-type heat exchange reactor according to a preferred embodiment of the present invention may include: a top surface plate assembled on a top of an assembly of the side surface plates and the fluid passage partition walls; a bottom surface plate assembled on a bottom of the assembly of the side surface plates and the fluid passage partition walls; a front surface plate assembled on a front side of the assembly of the side surface plates and the fluid passage partition walls; a rear surface plate assembled on a rear side of the assembly of the side surface plates and the fluid passage partition walls; connection members respectively assembled on the front surface plate and the rear surface plate; connection plates combined with different ends of extended portions of the top surface plate and the bottom surface plate so as to face with extended portions of the front surface plate and the rear surface plate; and a heat exchange fin structure inserted in the fluid passage channels.

According to the present invention, fluid passages of a reaction channel and a heat exchange channel can be provided by inserting a partitioning plate (fluid passage partition wall) having a length the same as a height of slits in two side surface plates on which the slits are formed and welding the partitioning plate and side surface plates from outside of the side surface plates, and, accordingly, the plate-type heat exchange reactor can be easily manufactured compared with a conventional technique by reducing the number of welding portions.

Although as many side bars as the number of fluid passage channels are needed in the conventional technique, since the side surface plates on which slits are formed according to the present invention may be a side wall configured as a single part having slits formed to be less than the number of desired fluid passage channels by one, reduction in the number of parts can be accomplished.

In addition, in the present invention, since a thickness of a member configuring an outer side is different from a thickness of a partitioning plate member separating the inner channel space, mechanical strength needed for each of the parts can be provided.

Furthermore, in the present invention, a heat exchange fin structure coated with or supported by a catalyst can be easily inserted into or removed from a reaction fluid passage channel after the reactor is assembled by welding.

Furthermore, according to the present invention, thermal deformation of the heat exchange fin structure for reaction can be suppressed by inserting a heat exchange fin structure for heat exchange into heat exchange fluid passage channels when the reactor is assembled by welding and inserting a heat exchange fin structure for reaction coated with (supported by) a catalyst into reaction fluid passage channels after the reactor is assembled by welding.

DETAILED DESCRIPTION OF THE PREFERRED EMBODIMENT

Hereafter, the preferred embodiments of the invention will be described in detail with reference to the accompanying drawings.

Figure 1:
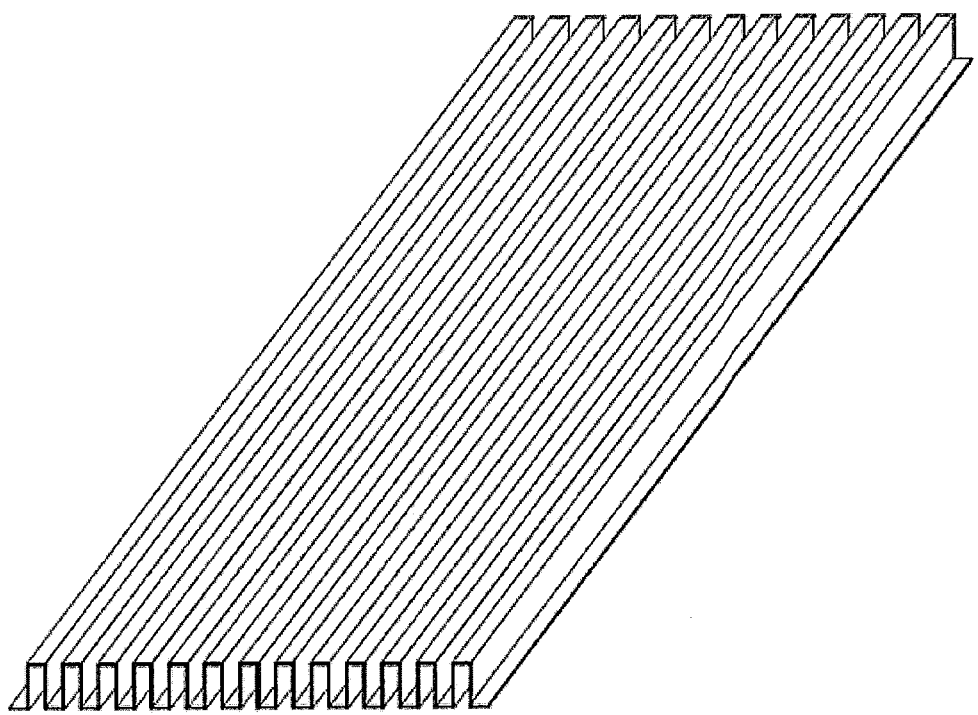
FIG. 1 is a perspective view showing a heat exchange fin structure according to the present invention.

FIG. 1 is a perspective view showing a heat exchange fin structure according to the present invention, and the heat exchange fin structure is a metal structure inserted as a heat exchange fin. The heat exchange fin structure may have a shape repetitively connecting mountains and valleys as shown in the figure. Although top and bottom sides are formed, for example, in the shape of straight lines in the figure, they also can be formed in the shape of zigzags, ripples, wrinkles or the like.

The heat exchange fin structures may be inserted into fluid passage channels, and, for example, heat exchange fin structures for heat exchange are inserted in some of the fluid passage channels, and heat exchange fin structures for reaction can be inserted in the other fluid passage channels. Particularly, the heat exchange fin structures for heat exchange can be inserted when the side surface plates and the fluid passage partition walls are assembled, and the heat exchange fin structures for reaction can be inserted after completion of final assembly of the reactor, and, accordingly, thermal deformation of the heat exchange fin structures for reaction can be suppressed. A catalyst may be coated or supported on the heat exchange fin structures for reaction.

Figure 2:
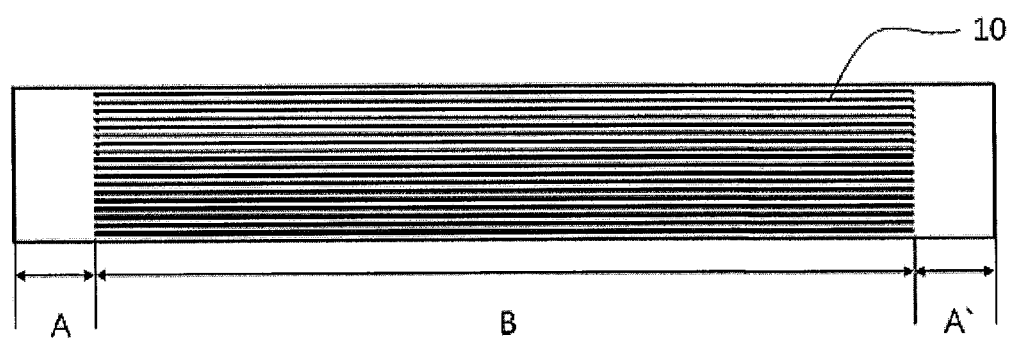
FIG. 2 is a front view showing a side surface plate on which slits are formed according to the present invention.

FIG. 2 is a front view showing a side surface plate 1 or 1' on which slits 10 are formed according to the present invention, and the side surface plate 1 or 1' may be configured of a long rectangular metal plate. A thickness of the side surface plate 1 or 1' may be for example 0.5 to 5 mm, preferably 1 to 2 mm.

A plurality of slits 10 is formed on the side surface plate 1 or 1' along a longitudinal direction. The present invention may easily manufacture a heat exchange reactor and save parts and unit price compared with a conventional technique by forming the slits 10 on the side surface plate 1 or 1'. That is, since the present invention may configure the side surface wall 1 or 1' of the heat exchange reactor as a single part on which the slits 10 are formed without using a plurality of side bars, it is easy to manufacture the reactor, and the unit price can be lowered.

Preferably, the slits 10 may be formed in parallel to each other. The slits 10 may be formed on the side surface plate 1 or 1' excluding end portions thereof, and, for example, the slits 10 may be formed on the side surface plate excluding 3 to 15 mm, preferably 5 to 10 mm from both ends of the side surface plate 1 or 1' in the longitudinal direction. That is, as shown in the figure, a length of the portions A and A' on which the slits 10 are not processed may be 5 to 10 mm, respectively. Accordingly, the slits 10 may be formed to have a length B, which is a segment of entire length of the side surface plate 1 or 1'.

A fluid passage partition wall 2 described below is inserted into the slits 10. The length and thickness of the slits 10 may be almost the same as a length and thickness of the fluid passage partition wall 2. A number of slits 10 may be smaller than a number of fluid passage channels described below by one. That is, the number of slits 10 may be (total number of fluid passage channels)−1.

Figure 3:
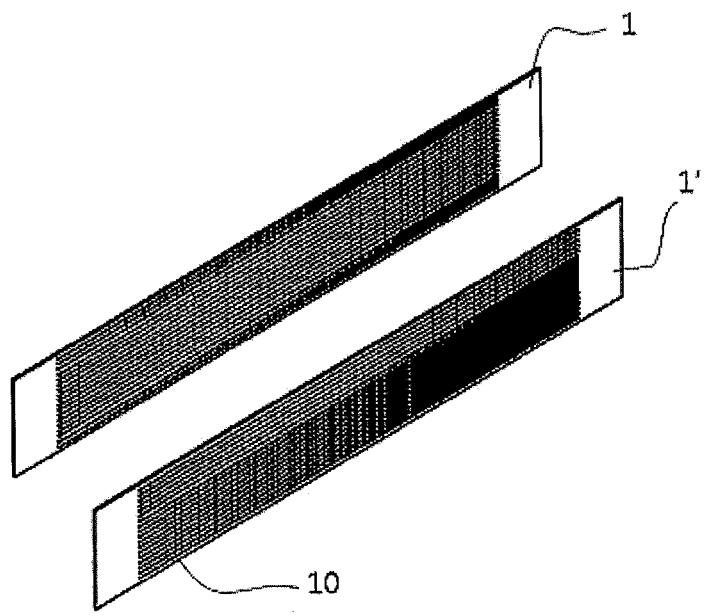
FIG. 3 is a perspective view showing two side surface plates arranged before inserting fluid passage partition walls for partitioning fluid passage channels according to the present invention.

FIG. 3 is a perspective view showing two side surface plates 1 and 1' arranged before inserting fluid passage partition walls 2 for partitioning fluid passage channels according to the present invention, and after preparing the side surface plates 1 and 1' provided with the plurality of slits 10 formed in parallel along the longitudinal direction, two side surface plates 1 and 1' are put upright in a vertical direction to be arranged with a space to face each other. The space for arranging the side surface plates 1 and 1' may be defined to include a distance between the side surface plates 1 and 1' and the thickness of the side surface plates 1 and 1'.

Figure 4:
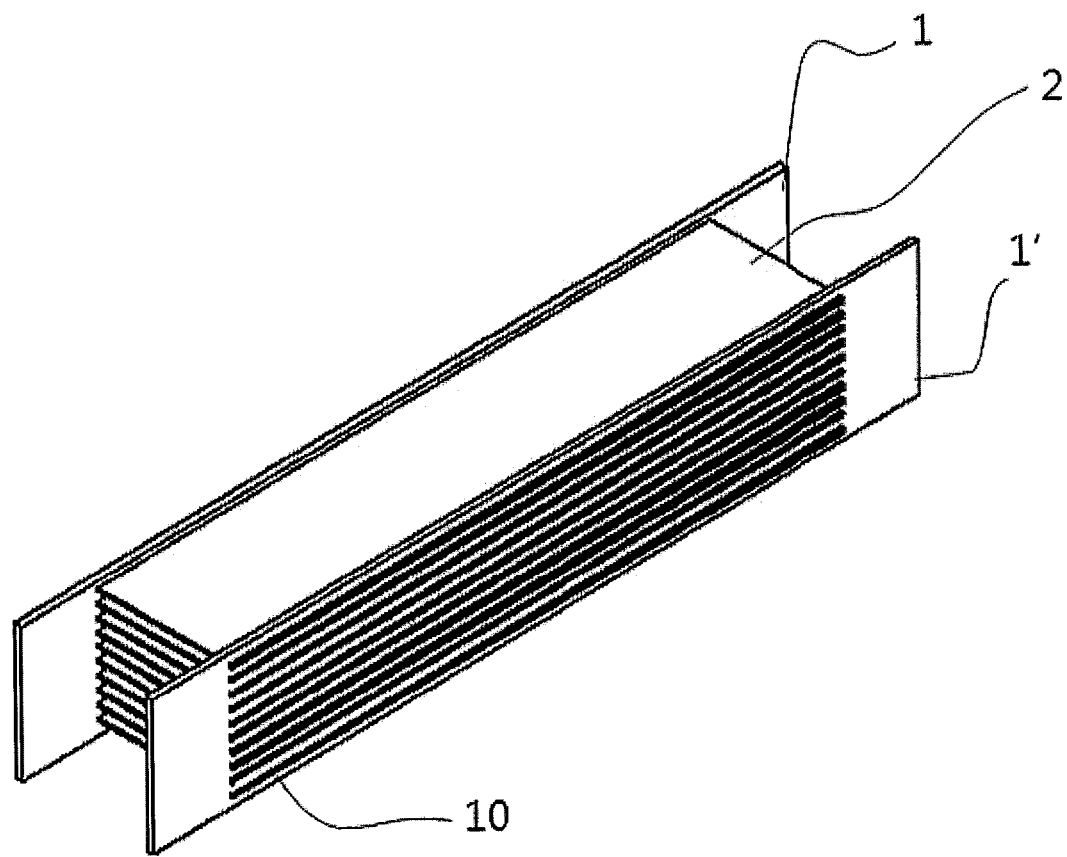
FIG. 4 is a perspective view showing an assembly manufactured by inserting and welding fluid passage partition walls in the slits of the side surface plates according to the present invention.

FIG. 4 is a perspective view showing an assembly manufactured by inserting and welding fluid passage partition walls 2 in the slits 10 of the side surface plates 1 and 1' according to the present invention, and after forming a plurality of fluid passage channels by inserting a plurality of fluid passage partition walls 2 into the slits 10 of the two side surface plates 1 and 1' in parallel in a horizontal direction, the side surface plates 1 and 1' and the fluid passage partition walls 2 are bonded. Inserting and bonding the fluid passage partition walls 2 may be sequentially progressed. The bonding may be performed by, for example, laser welding. Like this, as many slits 10 as the number of the fluid passage partition walls separating an inner channel space are formed on the side surface plates 1 and 1' configuring the reactor, and a welding process is performed while the fluid passage partition walls 2 are inserted into the slits 10 formed on both of the side surface plates 1 and 1'.

The fluid passage partition wall 2 may be a long rectangular metal plate. The fluid passage partition wall 2 may have a length and thickness corresponding to those of the slits 10. The thickness of the fluid passage partition wall 2 may be, for example, 0.05 to 5 mm, preferably 0.1 to 0.5 mm.

More fluid passage channels than the number of slits 10 by one can be formed by the fluid passage partition walls 2. That is, the number of fluid passage channels formed by the fluid passage partition walls 2 may be the number of slits 10+1.

Three-dimensional fluid passage channels are already formed while welding is progressed, and the welding can be progressed after installing an insert having a height similar to a height of the channels in order to maintain and support a shape and space (height) of the fluid passage channels. At this point, a heat exchange fin structure for heat exchange or a metal plate having projections and depressions which can be attached to or detached from the channels can be used as the insert.

Figure 5:
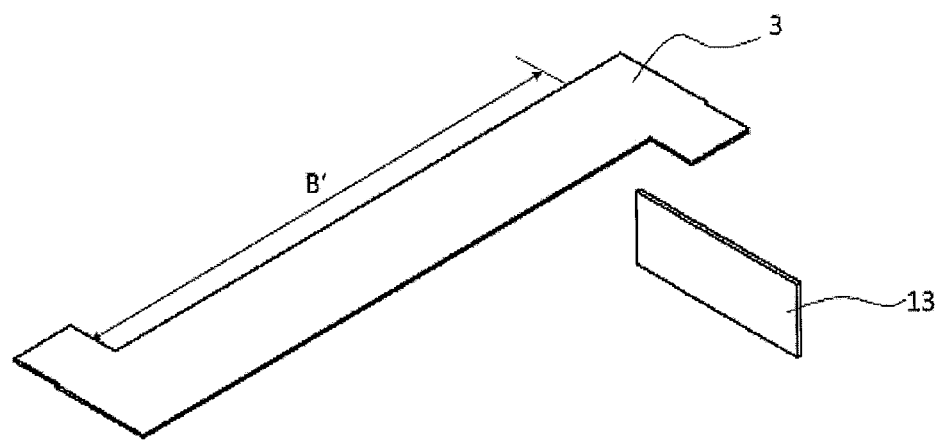
FIG. 5 is a perspective view showing a top surface plate and a bottom surface plate and a connection plate for forming inlet and outlet fluid passages according to the present invention.

FIG. 5 is a perspective view showing a top surface plate and a bottom surface plate 3 and a connection plate 13 for forming inlet and outlet fluid passages according to the present invention. The top surface plate and the bottom surface plate 3 have a width corresponding to the space of arranging the two side surface plates 1 and 1', and extended portions protruded in a horizontal direction beyond the space of arranging the two side surface plates 1 and 1' may be formed at both end portions of the top surface plate and the bottom surface plate. That is, the top surface plate and the bottom surface plate 3 consist of a rectangular metal plate having a width corresponding to the space of arranging the side surface plates 1 and 1' and may have a shape of protruding both end portions thereof to form a shape of letter L.

A length of the top surface plate and the bottom surface plate 3 excluding the extended portions at both ends may be shorter than the length of the slits 10 by 3 to 15 mm, preferably 5 to 10 mm. That is, as shown in the figure, a length B' of a straight portion excluding the extended portions is determined to be shorter than the length B of the slits 10, and the difference between B and B' may be about 5 to 10 mm.

Figure 13:
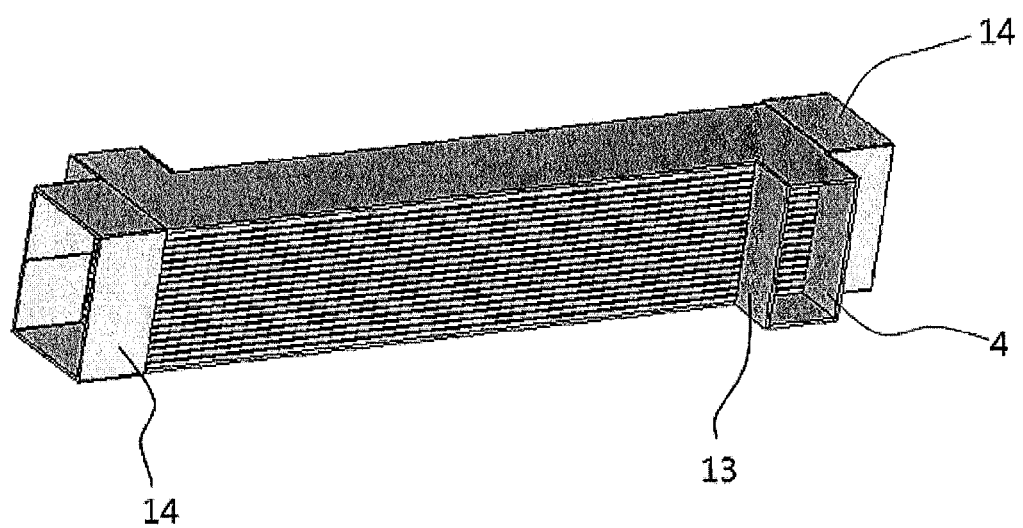
FIG. 13 is a perspective view showing a plate-type heat exchange reactor in which assembly of a fluid inlet and a fluid outlet is completed according to the present invention.

The connection plate 13 is a part for forming a connection unit, and at least two connection plates 13 can be used. The connection plate 13 may be configured using a rectangular metal plate. The connection plate 13 may be combined with one ends of the extended portions of the top surface plate and the bottom surface plate 3 to be faced with extended portions of a front surface plate and a rear surface plate 4. Inlet and outlet ports can be formed as shown in FIG. 13 by assembling the connection plates 13, the extended portions of the top surface plate and the bottom surface plate 3, and the extended portions of the front surface plate and the rear surface plate 4.

Figure 6:
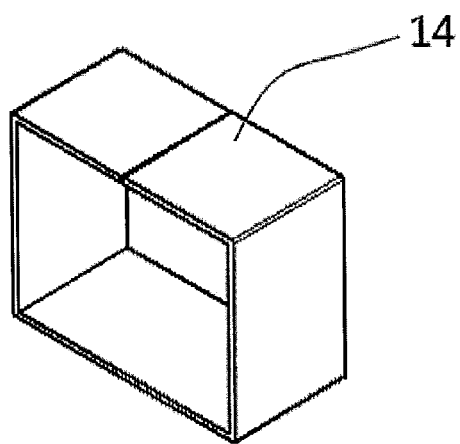
FIG. 6 is a perspective view showing a connection member for forming inlet and outlet fluid passages according to the present invention.

FIG. 6 is a perspective view showing a connection member 14 for forming inlet and outlet fluid passages according to the present invention, and the connection member 14 is a part for forming a connection unit, and at least two connection members 14 can be used. As shown in the figure, the connection member 14 may have a shape of a hexahedron corresponding to the height and arranging space of the two side surface plates 1 and 1' and having open front and rear sides.

Figure 7:
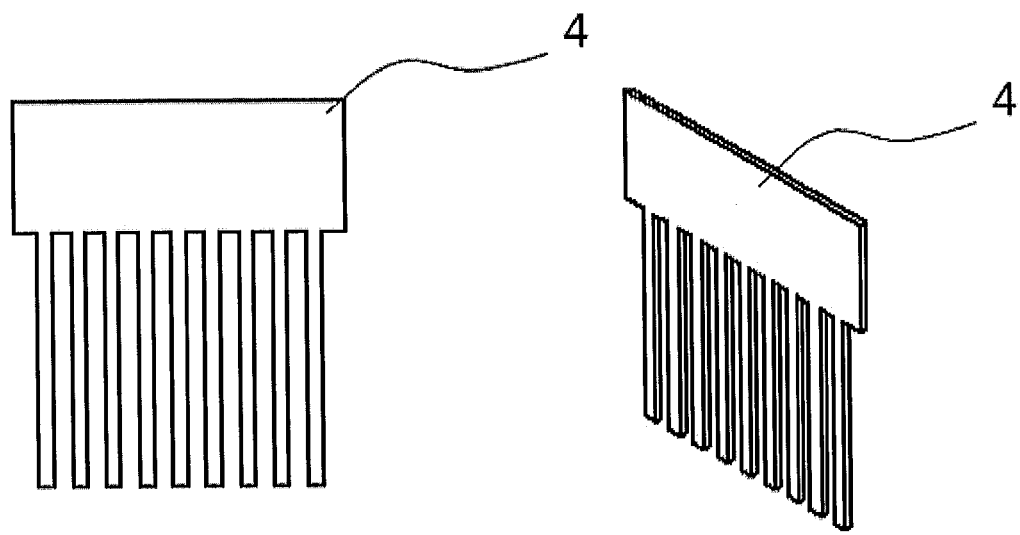
FIG. 7 shows a front view and a perspective view of a front surface plate and a rear surface plate according to the present invention.

FIG. 7 shows a front view and a perspective view of a front surface plate and a rear surface plate 4 according to the present invention, and the front surface plate and the rear surface plate 4 may be plates for blocking front and rear sides of the channels to prevent mixture of fluids between the channels. The front surface plate and the rear surface plate 4 may respectively have a plurality of branch units corresponding to the fluid passage partition walls 2 or the fluid passage channels and an extended portion combined with one ends of the extended portions of the top surface plate and the bottom surface plate 3. That is, as shown in the figure, the front surface plate and the rear surface plate 4 may be formed in a shape of a comb having a plurality of teeth.

The extended portions of the front surface plate and the rear surface plate 4 may have a size the same as the connection plate 13, and the branch units of the front surface plate and the rear surface plate 4 may have a size the same as the fluid passage partition walls 2 or the fluid passage channels.

The plurality of branch units may be independently combined with the fluid passage partition walls 2 and/or the fluid passage channels. For example, they can be combined only with the fluid passage partition walls 2 or only with the fluid passage channels, and, in addition, they can be combined to be overlapped across the fluid passage partition walls 2 and the fluid passage channels. In addition, the plurality of branch units may entirely or partially block the fluid passage channels or alternately block the fluid passage channels. New slits may be formed by cutting, for example wire cutting portions between the slits 10 positioned at the side of fluid passages corresponding to heat exchange fluid passages of which both ends are blocked by the branch units, and the new slits may be used as inlet and outlet fluid passages.

Figure 8:
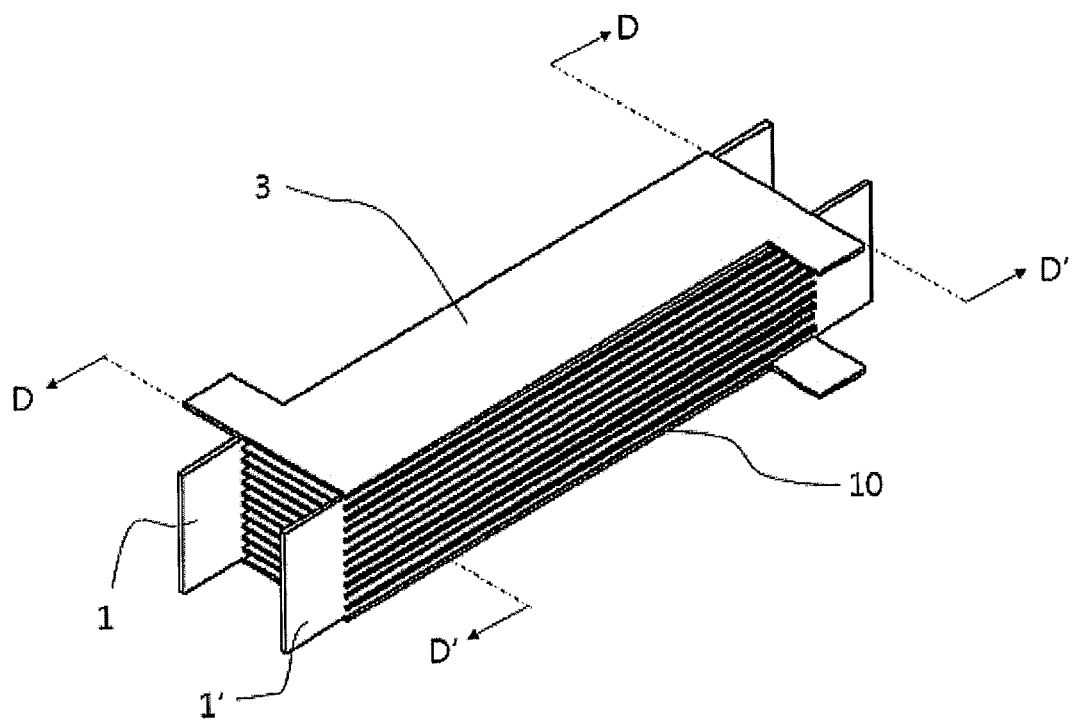
FIG. 8 is a perspective view showing an assembly configured by welding the top surface plate and the bottom surface plate on the assembly of FIG. 4.

FIG. 8 is a perspective view showing an assembly configured by welding the top surface plate and the bottom surface plate 3 on the assembly of FIG. 4, and the top surface plate and the bottom surface plate 3 are bonded on the top and bottom of the assembly of the side surface plates 1 and 1' and the fluid passage partition walls 2. The bonding can be performed by, for example, laser welding.

Figure 9:
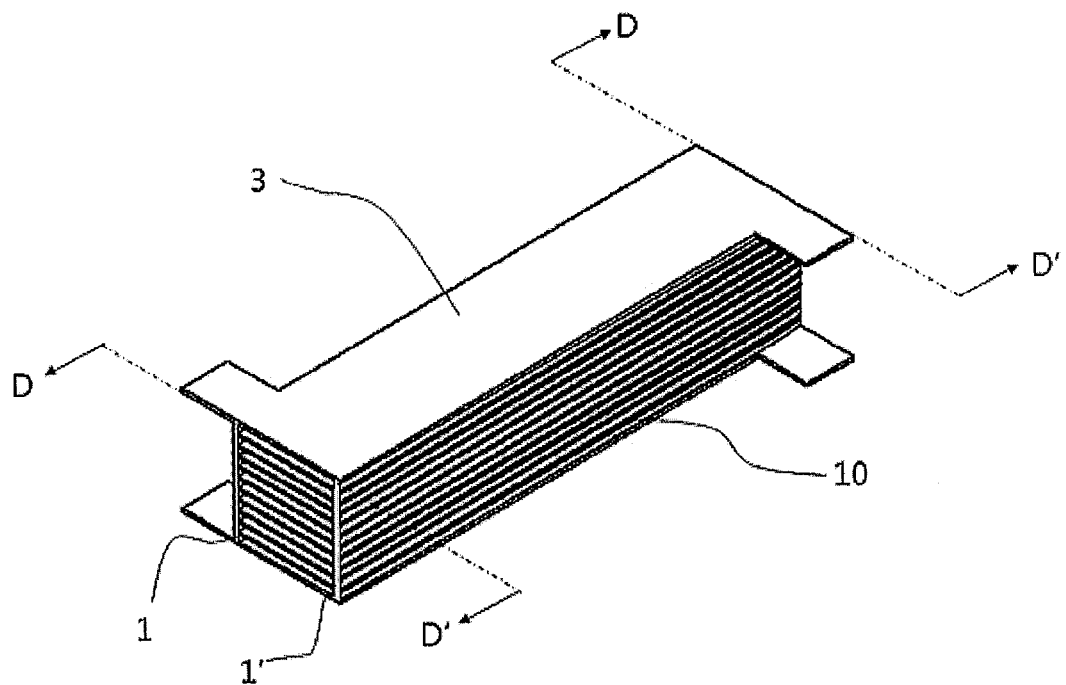
FIG. 9 is a perspective view showing an assembly obtained by cutting the assembly of FIG. 8 along a line D-D'.

FIG. 9 is a perspective view showing an assembly obtained by cutting the assembly of FIG. 8 along a line D-D', and after bonding the top surface plate and the bottom surface plate 3, both end portions of the two side surface plates 1 and 1' where the slits 10 are not formed may be cut. That is, the end portions may be cut along the line D-D' as shown in FIG. 8 in which the top surface plate and the bottom surface plate 3 are welded.

Figure 10:
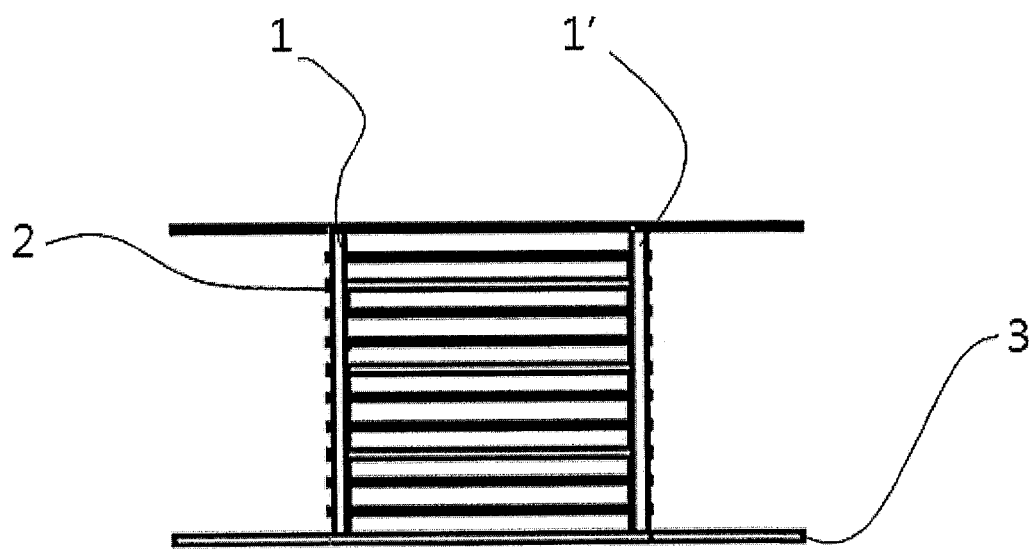
FIG. 10 is a cross-sectional view showing an assembly taken along the line D-D' of FIG. 9.

FIG. 10 is a cross-sectional view showing an assembly taken along the line D-D' of FIG. 9, and total ten fluid passage partition walls 2 are inserted in the slits 10 of the side surface plates 1 and 1' to form total eleven fluid passage channels. The number of fluid passage channels is not specially limited, and it can be changed appropriately as needed.

Figure 11:
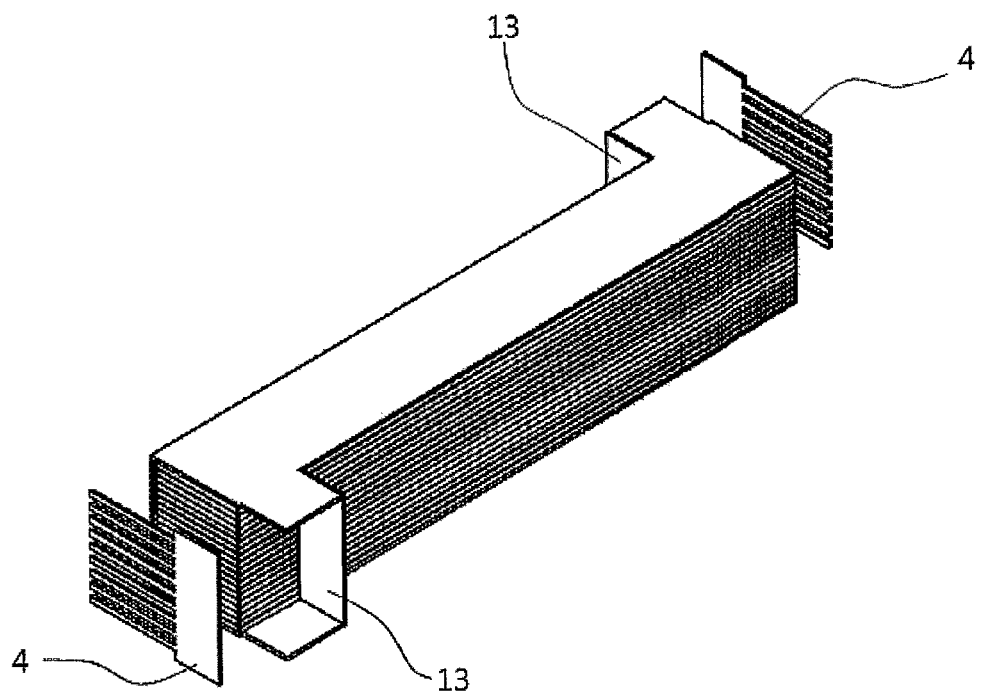
FIG. 11 is a perspective view showing a front surface plate and a rear surface plate assembled on the assembly of FIG. 9.

FIG. 11 is a perspective view showing a front surface plate and a rear surface plate 4 assembled on the assembly of FIG. 9, and after the cutting step of FIG. 9, the front surface plate and the rear surface plate 4 can be respectively bonded onto the front side and the rear side of the assembly. The front surface plate and the rear surface plate 4, which are plates for blocking the front and rear sides of the channels, are welded on the front side and the rear side, and fluids in the channels different from each other may be separated so as not to be mixed.

Figure 12:
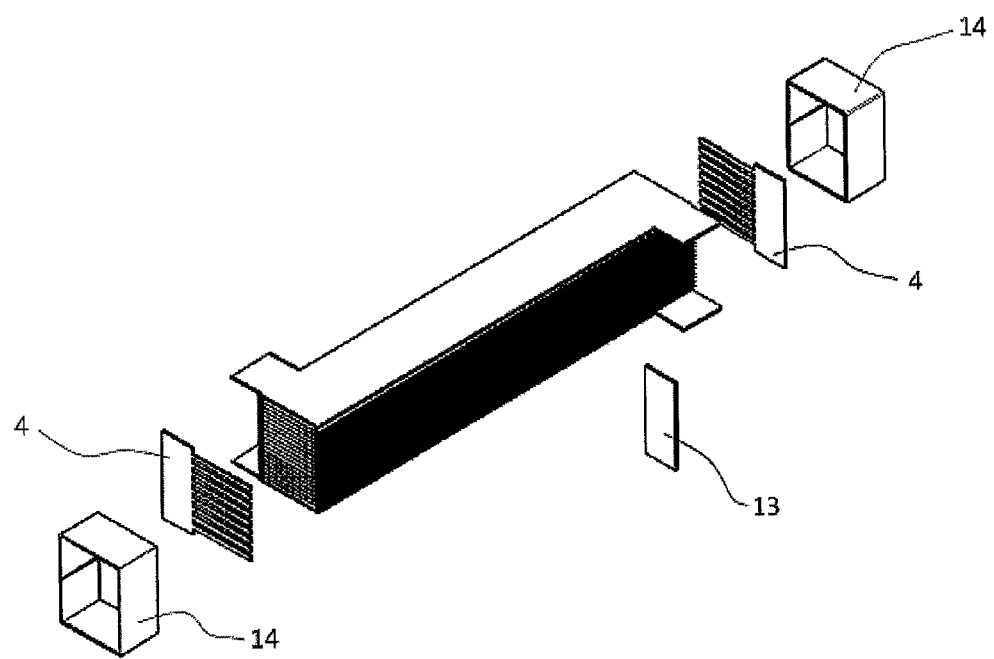
FIG. 12 is a perspective view showing a fluid inlet and a fluid outlet configured by assembling a front surface plate, a rear surface plate, connection members and connection plates on the assembly of FIG. 9.

FIG. 12 is a perspective view showing a fluid inlet and a fluid outlet configured by assembling a front surface plate 4, a rear surface plate 4, connection members 14 and connection plates 13 on the assembly of FIG. 9, and after the step of bonding the front surface plate and the rear surface plate 4, the connection members 14 can be respectively bonded to the front surface plate and the rear surface plate 4. After the step of bonding the connection members 14, the connection plates 13 combined with different ends of the extended portions of the top surface plate and the bottom surface plate 3 can be bonded to face the extended portions of the front surface plate and the rear surface plate 4. That is, as shown in the figure, forming the inlet and outlet ports can be finished by welding the connection plates 13 and the connection members 14. The welding can be progressed in order of, for example, the front surface plate and the rear surface plate 4, the connection members 14 and the connection plates 13. The connection plates 13 are installed toward the center of the reactor, and the extended portions of the front surface plate and the rear surface plate 4 are installed toward both ends of the reactors. In addition, the inlet and outlet ports formed on both sides of the reactor by assembling the connection plates 13, the extended portions of the top surface plate and the bottom surface plate 3, and the extended portions of the front surface plate and the rear surface plate 4 may be blocked, and the side surface plates 1 and 1' and/or the fluid passage partition walls 2 may be perforated to allow inflow and discharge of fluids.

FIG. 13 is a perspective view showing a plate-type heat exchange reactor in which assembly of a fluid inlet and a fluid outlet is completed according to the present invention, and the plate-type heat exchange reactor can be configured with two side surface plates 1 and 1' respectively provided with a plurality of slits 10 formed in parallel along a longitudinal direction and arranged in a vertical direction to face each other with a space therebetween; a plurality of fluid passage partition walls 2 respectively inserted in the slits 10 of the two side surface plates 1 and 1' in parallel in a horizontal direction to form a plurality of fluid passage channels; a top surface plate 3 assembled on a top of an assembly of the side surface plates 1 and 1' and the fluid passage partition walls 2; a bottom surface plate 3 assembled on a bottom of the assembly of the side surface plates 1 and 1' and the fluid passage partition walls 2; a front surface plate 4 assembled on a front side of the assembly of the side surface plates 1 and 1' and the fluid passage partition walls 2; a rear surface plate 4 assembled on a rear side of the assembly of the side surface plates 1 and 1' and the fluid passage partition walls 2; connection members 14 respectively assembled on the front surface plate and the rear surface plate 4; and connection plates 13 combined with different ends of extended portions of the top surface plate and the bottom surface plate 3 to be faced with extended portions of the front surface plate and the rear surface plate 4. In addition, at least one or more heat exchange fin structures as shown in FIG. 1 can be inserted in the fluid passage channels. While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

DESCRIPTION OF SYMBOLS

1: Side surface plates
2: Fluid passage partition wall
3: Top surface plate/Bottom surface plate
4: Front surface plate/Rear surface plate
10: Slit
13: Connection plate
14: Connection member

What is claimed is:

1. A method of manufacturing a plate-type heat exchange reactor, the method comprising the steps of:

preparing side surface plates respectively provided with a plurality of slits formed in parallel along a longitudinal direction, wherein the slits are formed on the side surface plates excluding both end portions of the side surface plates;

arranging two side surface plates in a vertical direction to face each other with a space therebetween;

forming a plurality of fluid passage channels by inserting a plurality of fluid passage partition walls into the slits provided on the two side surface plates in parallel in a horizontal direction; and bonding the side surface plates and the fluid passage partition walls; bonding a top surface plate and a bottom surface plate respectively having a width corresponding to the space of arranging the two side surface plates and having extended portions protruded in the horizontal direction beyond the space of arranging the two side surface plates at both end portions of the top surface plate and the bottom surface plate on a top and a bottom of an assembly of the side surface plates and the fluid passage partition walls; and cutting, after bonding the top surface plate and the bottom surface plate, the both end portions of the two side surface plates where the slits are not formed.

2. The method according to claim 1, wherein the slits are formed on the side surface plates excluding 5 to 10 mm from both ends of the side surface plates in the longitudinal direction.

3. The method according to claim 1, wherein a thickness of the side surface plate is 1 to 3 mm.

4. The method according to claim 1, wherein a thickness of the fluid passage partition wall is 0.1 to 0.5 mm.

5. The method according to claim 1, wherein a length of the top surface plate and the bottom surface plate excluding the extended portions at both ends is shorter than a length of the slits by 5 to 10 mm.

6. The method according to claim 1, further comprising the step of inserting a heat exchange fin structure having a shape repetitively connecting mountains and valleys into the fluid passage channels.

7. The method according to claim 6, wherein the heat exchange fin structure is divided into a heat exchange fin structure for heat exchange and a heat exchange fin structure for reaction, wherein the heat exchange fin structure for heat exchange is inserted when the side surface plates and the fluid passage partition walls are assembled, and the heat exchange fin structure for reaction is inserted after final assembly of the reactor is completed.

\* \* \* \* \*